United States Patent [19]
Garlen et al.

[11] Patent Number: 4,723,613
[45] Date of Patent: Feb. 9, 1988

[54] ELECTRONIC BALANCE

[75] Inventors: Daniel R. Garlen, Livingston; George A. Stiles, Longvalley; James Kroeger, South Orange, all of N.J.

[73] Assignee: Ohaus Scale Corporation, Florham Park, N.J.

[21] Appl. No.: 866,238

[22] Filed: May 21, 1986

[51] Int. Cl.$^4$ ............... G01G 19/52; G01G 23/14
[52] U.S. Cl. ........................... 177/50; 177/164
[58] Field of Search ................. 177/50, 164, 165

[56] References Cited

U.S. PATENT DOCUMENTS

| | | | |
|---|---|---|---|
| 3,716,706 | 2/1973 | Gray | 235/151.33 |
| 3,727,706 | 4/1973 | Streater et al. | 177/165 X |
| 4,080,657 | 3/1978 | Caldicott et al. | 177/50 X |
| 4,181,946 | 1/1980 | Loshbough et al. | 364/466 |
| 4,219,089 | 8/1980 | Gard et al. | 177/165 |
| 4,313,509 | 2/1982 | Engels | 177/50 |
| 4,328,874 | 5/1982 | Gumberich et al. | 177/25 |
| 4,412,591 | 11/1983 | Reichmuth et al. | 177/1 |
| 4,462,473 | 7/1984 | Valestin | 177/25 |
| 4,481,587 | 11/1984 | Daniels, Jr. | 364/466 |
| 4,512,428 | 4/1985 | Bullivant | 177/25 |
| 4,525,794 | 6/1985 | Scheffer et al. | 364/567 |
| 4,535,854 | 8/1985 | Gard et al. | 177/1 |
| 4,535,857 | 8/1985 | Haze | 177/50 |
| 4,565,254 | 1/1986 | Matsuura | 177/50 X |

Primary Examiner—George H. Miller, Jr.

[57] ABSTRACT

An electronic balance having a stored setup routine for defining scale operating parameters. An indicating device, which may be interchangeably connected to a plurality of weighing platforms, is responsive to an identifying connector to select from a memory operating parameters related to an operational characteristic of the weighing platform during the setup routine. A plurality of multi-function manually actuated buttons permit user selection of operating parameters during the setup routine. A sealable switch is used to restrict access to the setup routine. The balance operates in weighing or parts counting modes and can display weight in the parts counting mode. The balance can also provide a user with an indication of whether a dead-load or span adjustment is necessary.

4 Claims, 19 Drawing Figures

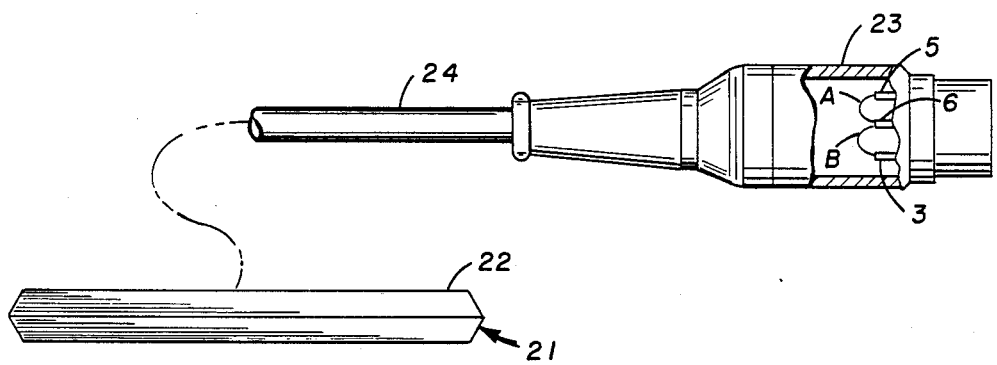
FIG. 3
| CAPACITY | JUMPERS | |
|---|---|---|
| | A | B |
| 30 LB | | |
| 60 LB | | X |
| 100 LB | X | |
| 150 LB | X | X |
FIG. 4
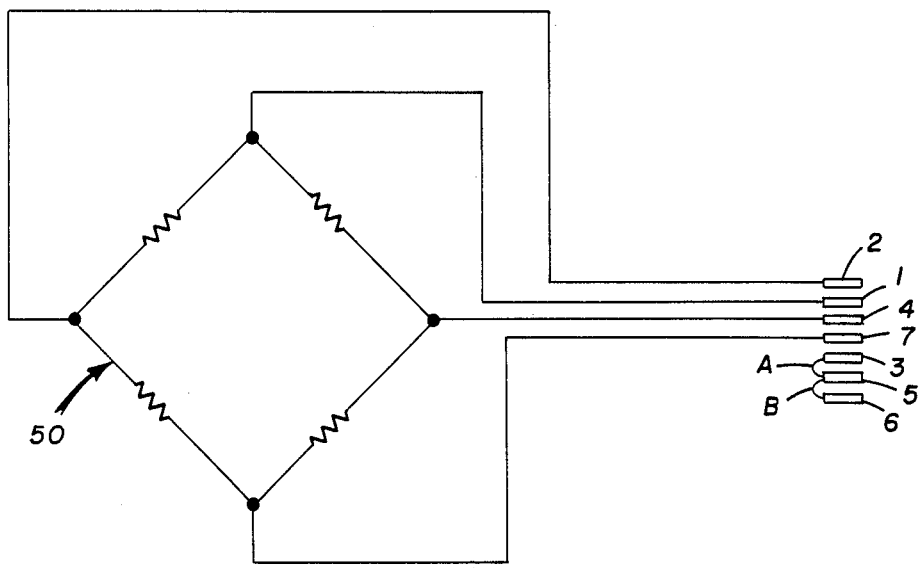
FIG. 5A

ELECTRONIC BALANCE

FIELD OF THE INVENTION

The invention relates generally to electronic balances, and more particularly to electronic balances having a plurality of selectable operating parameters and modes.

BACKGROUND OF THE INVENTION

Electronic balances having setup or calibration modes during which one or more operating parameters are programmed into the balance are well known. In the past, a separate input switch was typically provided for each operating parameter which the user was to program. In complex balances, in which a large number of operating parameters were to be entered, the result was a balance having a multiplicity of switches which was difficult to operate.

An electronic balance having interchangeable weighting platforms in which each weighing platform contains a data storage unit, such as a PROM, for storing operating parameters is shown in U.S. Pat. No. 4,313,509. After connecting a weighing platform to an evaluating device, the stored operating parameters are automatically transmitted to the evaluating device from the weighing platform's data storage unit. Such an arrangement, however, requires that every weighing platform include complex and expensive data storage circuitry.

An electronic balance in which the user can sequentially select operating parameters by means of one of the normal scale controls, such as a TARE switch, is shown in U.S. Pat. No. 4,328,874. However, since selection of a value for each operating parameter is performed sequentially every time the scale is turned on, valuable time is required to set the scale up even when the same operating parameters are to be used from operation to operation.

U.S. Pat. No. 4,412,591 shows an electronic scale in which a single key causes each of a plurality of modes and/or parameters to be selected in sequence. A storage device retains selected parameter values for future use. Access to certain modes or parameters can be prevented by means of jumpers connected to inputs of a microcomputer. In such an arrangement, the use of a single key to sequentially cycle through all the available modes and parameters when it is only desired to input values for a parameter at the end of the sequence requires increased setup time. In addition, inadvertent access to restricted modes and parameters may be granted as a result of an error in the microcomputer's processing of the jumper connection information.

U.S. Pat. No. 4,525,794 shows an electronic balance in which normal scale controls, such as an OFF switch and an ON/TARE switch, are used to select one of several operating modes or parameters. Simultaneous depression of the OFF and ON/TARE switches either permits a user to choose the units in which weight is displayed or, if the balance has the ability to perform parts counting, activates the parts counter mode. Once in the parts counter mode, the balance must be turned off and then on again to return to the ordinary weighting mode. Depression of the ON/TARE switch for a predetermined period of time permits a user to access a calibration routine. A calibration-enable switch connected to an input of a microprocessor can be used to prevent access to the calibration routine. Dead-load adjustment is accomplished by adjusting a potentiometer so that the output signal of a strain guage tranducer is nearly equal to zero when the pan is empty.

In such an arrangement, the need to simultaneously depress a plurality of switches to select a desired operating mode or parameter makes setup difficult. In addition, the inability to perform a weighing operation when in the parts counting mode is inconvenient. Undesired access to the calibration routine may also be granted as a result of an error in the microprocessor's handling of the calibration enable switch information. In addition, since the balance does not indicate if the dead-load adjustment procedure has been properly carried out, there is a possibility that the adjusting potentiometer may be incorrectly set.

SUMMARY OF THE INVENTION

The present invention overcomes the difficulties found in the prior art by providing an electronic balance in which a stored setup routine permits a user to directly access any of several operating parameters by operating one of a plurality of multifunction controls. The setup routine is stored in a memory and access to the setup routine is restricted by a switch directly connected to an address line of the memory. The balance has an indicating device to which a plurality of different capacity weighing platforms may be interchangeably connected. Each weighing platform has a simple identifying connector which can be recognized by the indicating device to retrieve stored operating parameters from a memory in the indicating device.

The balance of the present invention has a parts counting mode in which weighing operations may be easily performed without the need to exit the parts counting mode.

In addition, the balance of the present invention can provide a user with an indication of whether a dead-load adjustment is necessary and has been correctly carried out.

BRIEF DESCRIPTION OF THE DRAWINGS

FIG. 3 shows a weighing platform and identifying connector.

FIG. 4 is a table showing jumper connections for identifying the capacity of a weighing platform.

FIG. 5A is a schematic diagram of the circuitry in the weighing platform.

DETAILED DESCRIPTION OF THE INVENTION

Figure 1:
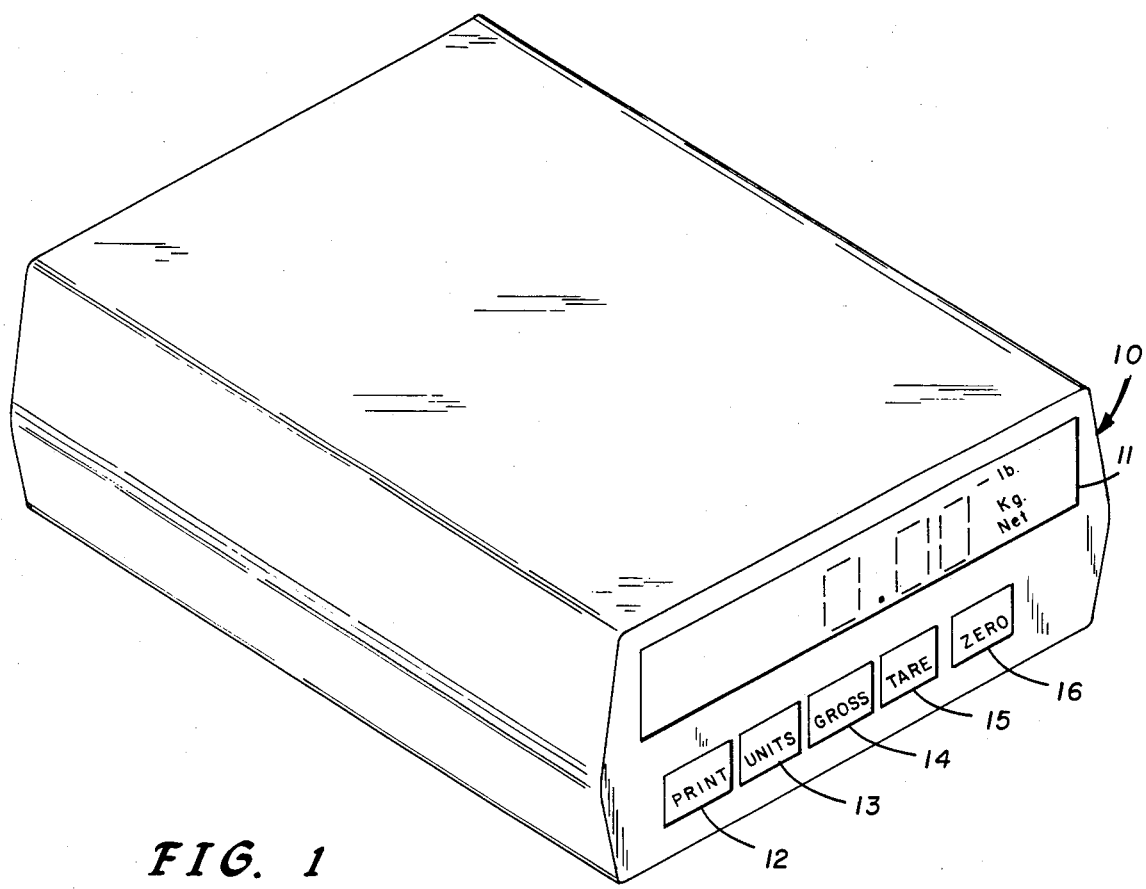
FIG. 1 is a perspective view of the indicating device.

The electronic balance of the present invention includes an indicating device which can be interchangeably connected with several weighing platforms. A perspective view of the indicating device 10 is shown in FIG. 1. Indicating device 10 has a display 11, which may be a vacuum fluorescent display having a plurality of multi-segment elements. Each of the multi-segment elements is capable of displaying a decimal digit and selected letters of the alphabet. Decimal point segments are provided adjacent some of the multi-segment elements to display fractional weight units. Indicating device 10 also has a plurality of front panel switches, including a PRINT button 12, UNITS button 13, GROSS button 14, TARE button 15, and ZERO button 16.

PRINT button 12 functions normally to enable communication between the balance and a remote computer or printer.

UNITS button 13 is normally used to select the weighing mode in which the scale will operate. The balance is preferably capable of displaying weight in pounds or kilograms, and of operating in a parts counting mode. In the parts counting mode, the balance displays the number of substantially uniform parts that have been placed on the weighing platform.

The GROSS button 14 is used to read the total weight contained on the weighing platform.

TARE button 15 is normally used to store the weight of an empty container so that it will be automatically subtracted from further readings.

ZERO button 16 is normally used to null out the weight of the weighing platform and any small accumulation of foreign matter on the weighing platform.

As discussed below, in accordance with the present invention, PRINT button 12, UNITS button 13, TARE button 15, and ZERO button 16 are also used to calibrate and adjust the balance and to select a plurality of setup and computational values to be used in calculating weights and parts counts.

Figure 2:
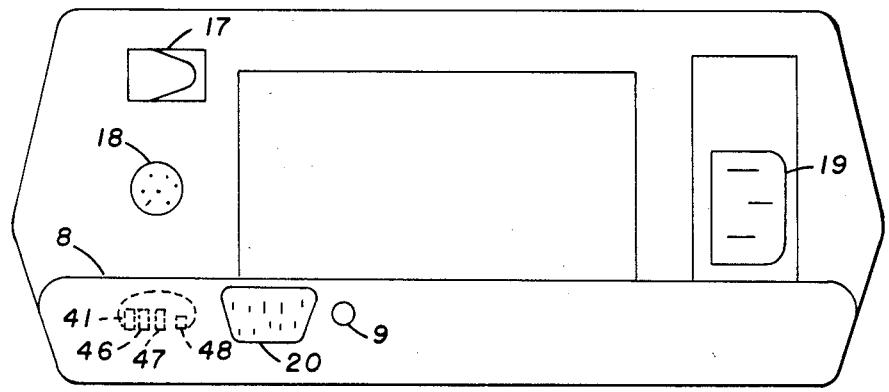
FIG. 2 is a rear view of the indicating device.

A rear view of the indicating device 10 is shown in FIG. 2. On/off control switch 17 selectively activates or deactivates the indicating device 10. A load receiver cable receptacle 18 receives a connector 23 (see FIG. 3) from a weighing platform cable to permit coupling and decoupling of a weighing platform to the indicating device 10. Power cord receptacle 19 receives a power cord to connect the indicating device to a suitable source of power. Interface connection 20 receives an electrical cable for bi-directional communication between a remote computer or other peripheral, such as a printer, and the indicating device 10. Interface connection 20 is, preferably, an RS-232 compatible interface.

Setup enable dip switch 41 located behind plate 8 has first and second positions. In the first position, setup enable switch 41 accesses a stored setup routine or menu FIGS. 6A and 6B so that a user may select the balance address, program constants, and averaging level, adjust for dead-load, and calibrate the balance. In the second position, setup enable switch 41 prohibits access to the stored setup menu but permits weighing and parts counting operations to be performed. Once setup of the balance has been completed, plate 8 may be sealed by Weights and Measures officials to prevent movement of switch 41 from the second to the first position.

Also located behind plate 8 are an opening 9 through which variable resistor 31 (FIG. 5B) may be adjusted and dip switches 46, 47, 48. Dip switch 46 enables parts counting in a first position and disables parts counting in a second position. Dip switch 47 enables an autoprint function to continuously transmit data via an RS-232 interface in a first position and disables the function in a second position. Dip switch 48 determines whether the calibration weight displayed during calibration will be in kilograms (kg.) or pounds (lb.).

As illustrated in FIG. 3, each weighing platform 21 has a pan 22 for receiving an object or load to be measured. Weighing platform 21 houses a load sensor, preferably a strain gauge sensor, which produces an electrical signal representing the load on the platform. This electrical signal is transmitted by means of electrical cable 24 to the indicating device. One end of the cable 24 is connected to weighing platform 21 and the other end is connected to a connector 23. Connector 23 mates with receptable 18 on the indicating device 10 to permit easy coupling and decoupling of weighing platform 21. Different capacity weighing platforms can be interchangably connected to the indicating device.

In accordance with one aspect of the invention, connector 23 includes a plurality of pins which mate with an equal number of sockets in receptable 18. Pins 3, 5, and 6, in conjunction with jumpers A and B, generate a capacity ID signal identifying the capacity of the weighing platform when connected to the indicating device. Jumpers A and B are used to selectively connect pins 3 and 5, respectively, to pin 6.

As shown in FIG. 4, jumpers A and B can provide four different configurations of pins 3, 5, and 6 to uniquely identify four different capacity weighing platforms. When connector 23 is connected to receptable 18 on indicating device 10, the configuration of pins 3, 5, and 6 is sensed by a microprocessor peripheral expansion chip 36 (FIG. 5B) to identify the weighing platform capacity.

Connector 23 also contains pins 1, 2, 4, and 7 (FIG. 5A) which are used to provide a signal from the load sensor indicating the load on the weighing platform.

FIG. 5A is a schematic diagram of the circuitry in weighing platform 21 and connector 23. Load sensor 50 is a conventional device, such as a strain gauge transducer having a four-arm resistive bridge. A suitable transducer is shown, for example, in U.S. Pat. No. 4,525,794 to Scheffer et al. Pins 1, 2, 4, and 7 are connected to load sensor 50 via cable 24. Pins 3 and 5 are selectively connected to pin 6 by jumpers A and B in accordance with the capacity of the associated weighing platform.

Figure 5B:
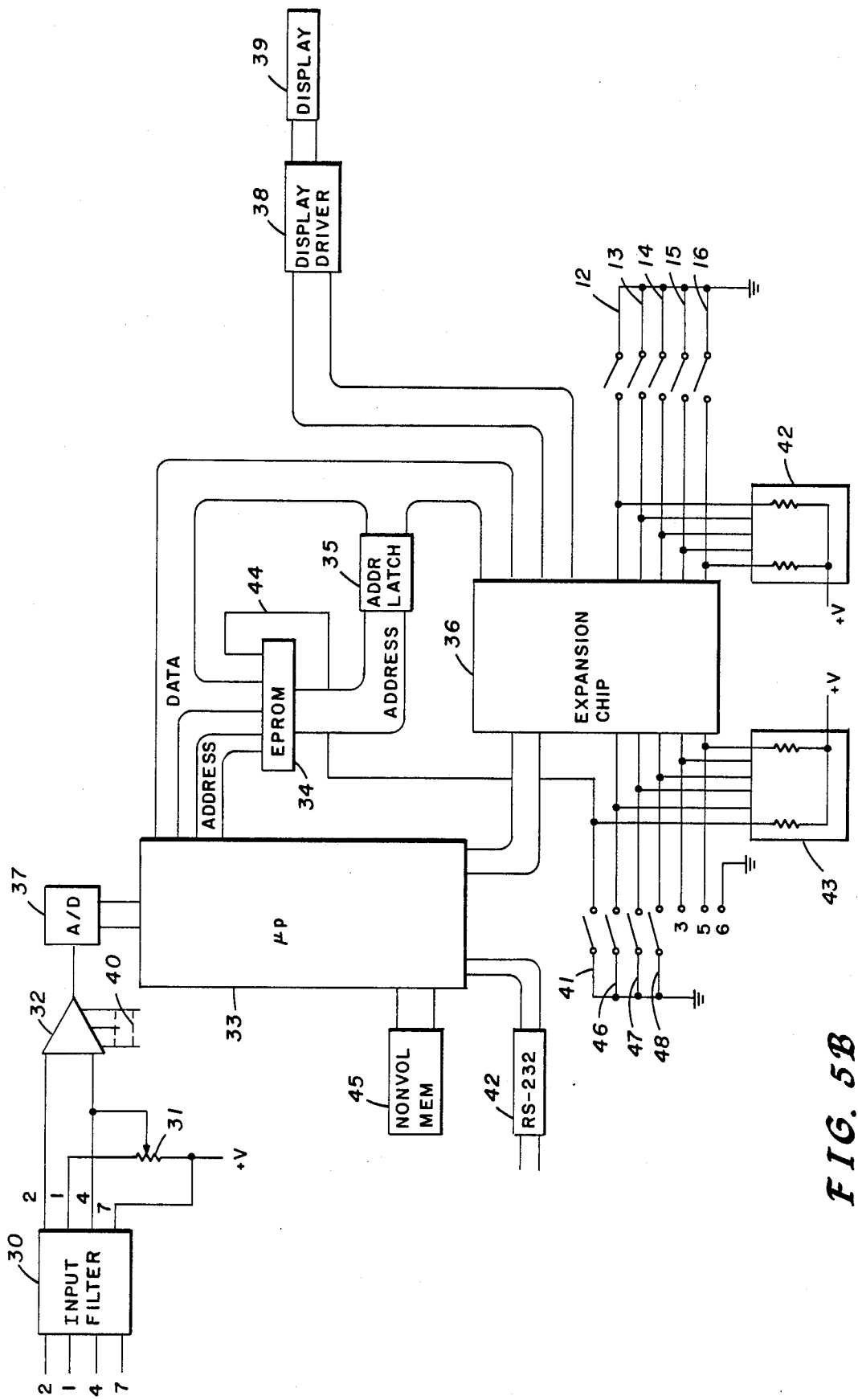
FIG. 5B is a schematic diagram of the circuitry in the indicating device.

FIG. 5B is a schematic diagram of the circuitry in indicating device 10. Input filter 30 receives and filters the output signal from load sensor 50. Variable resistor 31 is connected to the input of a programmable gain differential amplifier 32. During a dead-load adjust procedure described in FIG. 10, resister 31 is adjusted to compensate for the dead load of the weighing platform. The signal from the input filter is then amplified by amplifier 32. Switches 40 are used to selectively adjust the gain of amplifier 32 to one of four preset values during a span verification procedure described in FIG. 10. The analog output signal of amplifier 32 is converted to a digital value by A/D converter 37. The digital output of A/D converter 37 is processed by microprocessor 33 and then displayed via display driver 38 and display 39 to provide a visual indication relating to the weight of a load on weighing platform 21.

Microprocessor 33 controls the balance in accordance with programs stored in EPROM 34. Address latch 35 is provided for receiving and storing a first portion of an EPROM address word from microprocessor 33. The second portion of the address word is directly output from microprocessor 33 to the EPROM 34. The information at a given address in EPROM 34 is read in response to the combined first and second address portions. Level shifters 52, forming an RS-232 interface, are connected to microprocessor 33 to permit bi-directional communication with a remote computer. Weight related data may be output from the balance. Input commands may also be received from the remote computer. The balance responds to input commands to send weight related data, tare out weight on the platform, change units, zero the balance, calibrate the balance, and set the average piece weight or parts constant for parts counting.

Nonvolatile memory 45 is connected to microprocessor 33 and stores values for the address, averaging level, capacity, calibration weight, full scale, divisions, decimal point location, parts counting sample size, and span constant.

Microprocessor 33 is also connected to a microprocessor peripheral expansion chip 36, which expands the RAM, timing circuitry, and input and output ports available on the microprocessor 33. The PRINT, UNITS, GROSS, TARE, and ZERO buttons and dip switches 46, 47, and 48 are connected to input ports on peripheral expansion chip 36. Pull-up resistors 42 and 43 provide normally HI input signals to these ports. Depression of a button or closing a switch changes the signal on its associated input port to LO.

Capacity ID pins 3 and 5 of connector 23 are also connected to input ports on peripheral expansion chip 36 when the connector 23 is attached to receptacle 18. Connecting pins 3 or 5 to grounded pin 6 with jumpers A or B causes the signal on the associated input port to change to LO. As discussed above with respect to FIG. 4, there are four possible configurations of pins 3, 5, and 6, each of which is associated with a different capacity weighing platform. Peripheral expansion chip 36 identifies the weighing platform capacity in response to the signals on the input ports connected to pins 3 and 5. Peripheral expansion chip 36 is also connected to display driver 38 to permit the display of alphanumeric setup information.

Setup enable switch 41 is connected to an address line 44 on EPROM 34. Pull-up resistors 43 provide a HI signal to the address line when switch 41 is open. Closing switch 41 causes a LO signal to be provided to the address line. When switch 41 is closed, the balance will operate exclusively in the setup mode in accordance with the setup menu shown in FIGS. 9A and 9B. When switch 41 is open, access to the setup mode is disabled and the balance functions exclusively in the operate mode to perform weighing or parts counting operations. It is only in the setup mode that a user may set the balance address, program constants, and averaging level, adjust for dead-load, and calibrate the balance. Once setup has been performed, switch 41 may be sealed in the open position by Weights and Measures officials to prevent access to the setup mode and tampering with the setup information.

The programs executed during the setup and operate modes are stored in two separate sections of EPROM 34. The first section stores the programs to be executed during the operate mode. The second section stores the programs to be executed in the setup mode. The scale operates in either the operate or setup mode based on the position of switch 41. The position of switch 41 determines the most significant bit of the address word and thus whether the first or second section of EPROM 34 is addressed. By way of example, a "1" on address line 44, indicating that switch 41 is open, causes the microprocessor to execute the program relating to the operate mode. A "0" on address line 44, causes the microprocessor to execute the program relating to the setup mode.

The use of a dedicated address line 44 connected directly to setup enable switch 41 as described above thus insures that an error in sensing the position of an enable switch connected directly to a microprocessor, as in the prior art, or a subsequent error in the processing of the sensed information will not inadvertently permit access to the setup mode by unauthorized persons. Sealing switch 41 in the open position prevents deliberate and accidental attempts to permanently change the calibration of the balance to defraud the public, since it is not possible to access the setup mode when switch 41 is open.

The use of setup enable switch 41 to select between two portions of EPROM 34 also permits microprocessor 33 to access more memory than it would normally be capable of accessing.

Examples of the circuitry of FIGS. 5A and 5B can be found in a series of electronic balances marketed by Ohaus Scale Corporation under the Benchmaster and Indicator Only trademarks. Those balances were first used in public or placed on sale less than one year before the filing date of this application.

FIGS. 6A–17 are flow charts representing the content of EPROM 34 that is pertinent to this invention. It is believed that these flow charts are all that is necessary for a person skilled in the art to make, use, or otherwise carry out the invention of this application. The actual program steps can be derived from these flow charts using well-known programming languages readily available for use with generally available microprocessor chip sets chosen to implement the circuitry of FIG. 5B. The specific nature of those steps are not considered a part of the invention of this application and are not discussed further here. Any listing of such program steps directing the operation of the microprocessor in accordance with the flow charts of FIGS. 6A–17 would be as suitable for use in this invention as any other listing of such program steps.

Figure 6A:
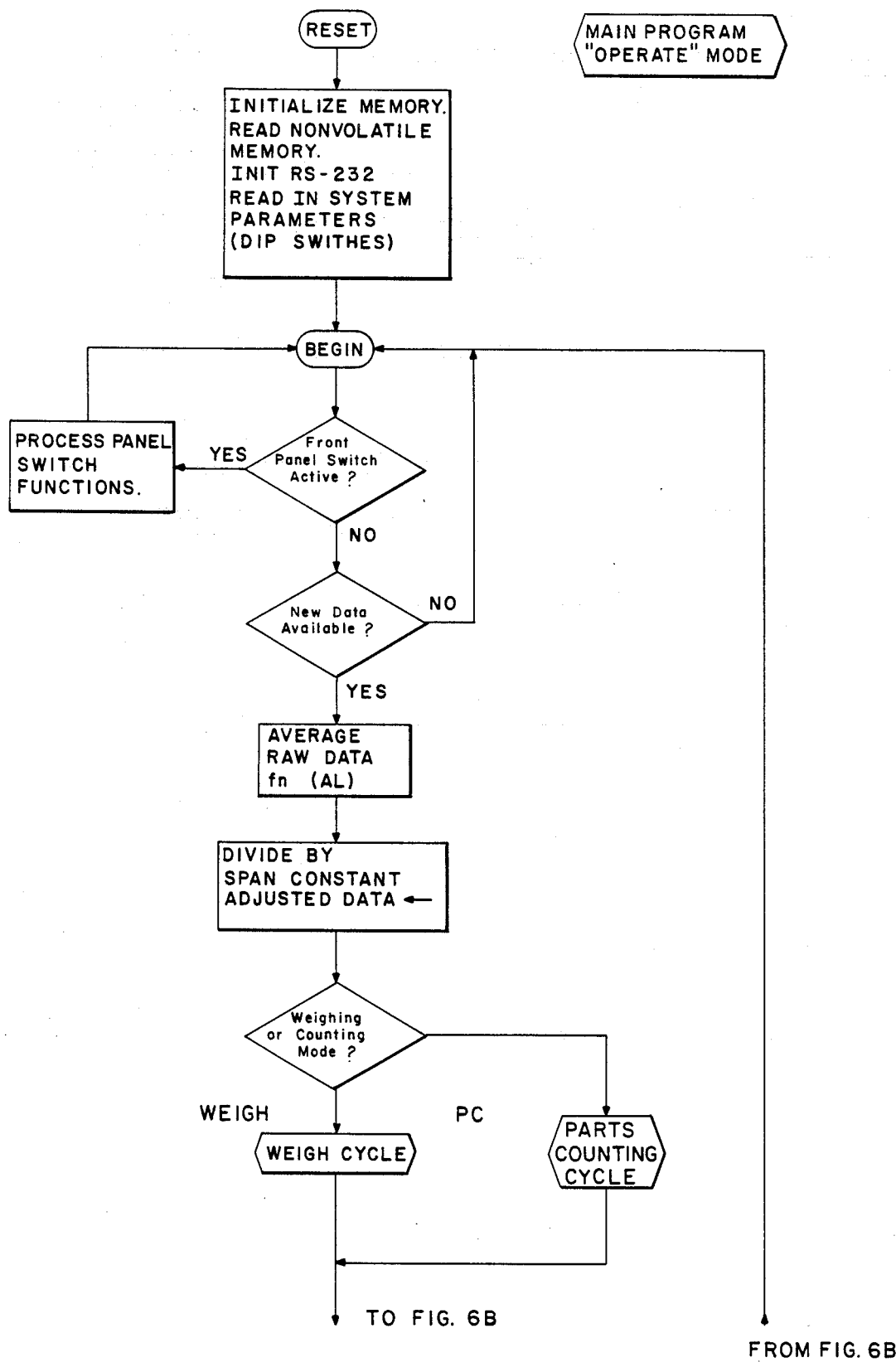
FIGS. 6A-17 are flow charts illustrating the software used in conjunction with the circuitry of FIG. 5B.
Figure 6B:
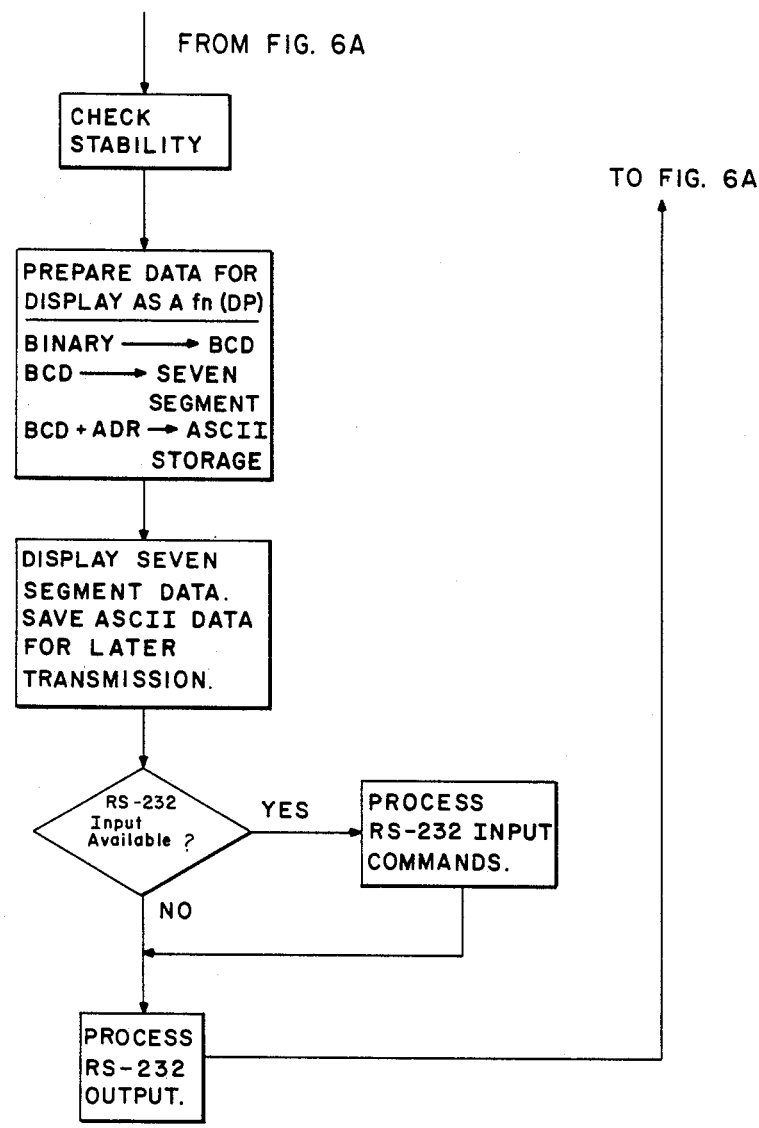

FIGS. 6A and 6B illustrate the main program stored in EPROM 34 to be executed by the microprocessor when the balance is in the operate mode. This program is accessed when calibrate-enable switch 41 is open and a "1" is therefore present on address line 44. When the balance is initially turned on, a reset operation is performed in which the microprocessor internal memory is initialized, nonvolatile memory 45 read, the RS-232 interface is initialized, and system parameters are read in from dip switches 46, 47, and 48. The microprocessor then determines if any of the front panel buttons or switches 12–16 are active. If so, the function associated with the active switch is processed and then the front panel switches checked again for activity. If no front panel switch is active, a determination is made if new weight data is available. If no new data is available, the front panel switches are then checked for activity. If new data is available, an average raw data value is calculated as a function of the averaging level read from nonvolatile memory 45. This value is then divided by the span constant read from nonvolatile memory 45 to arrive at an adjusted data value.

Figure 7:
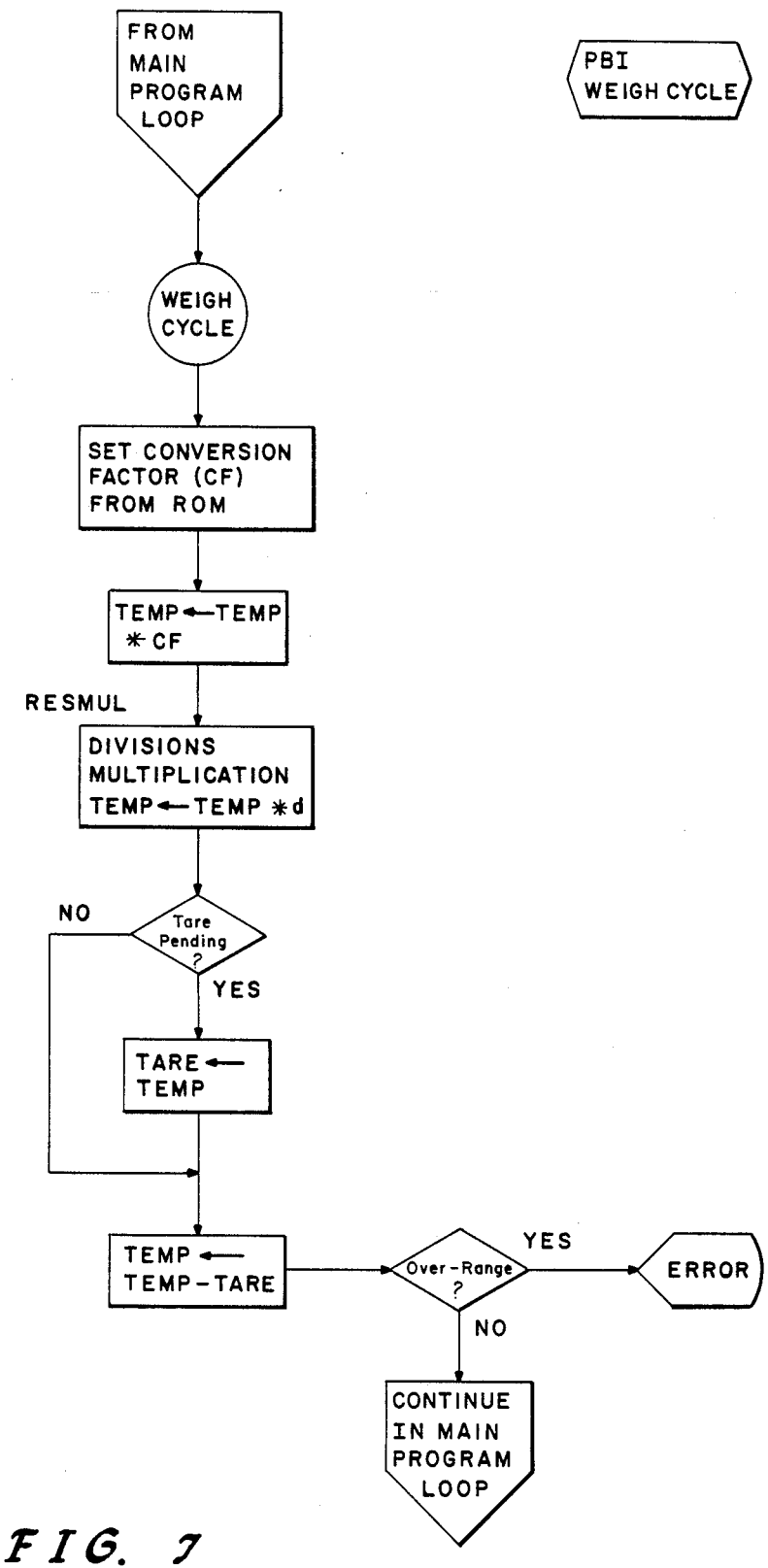
Figure 8A:
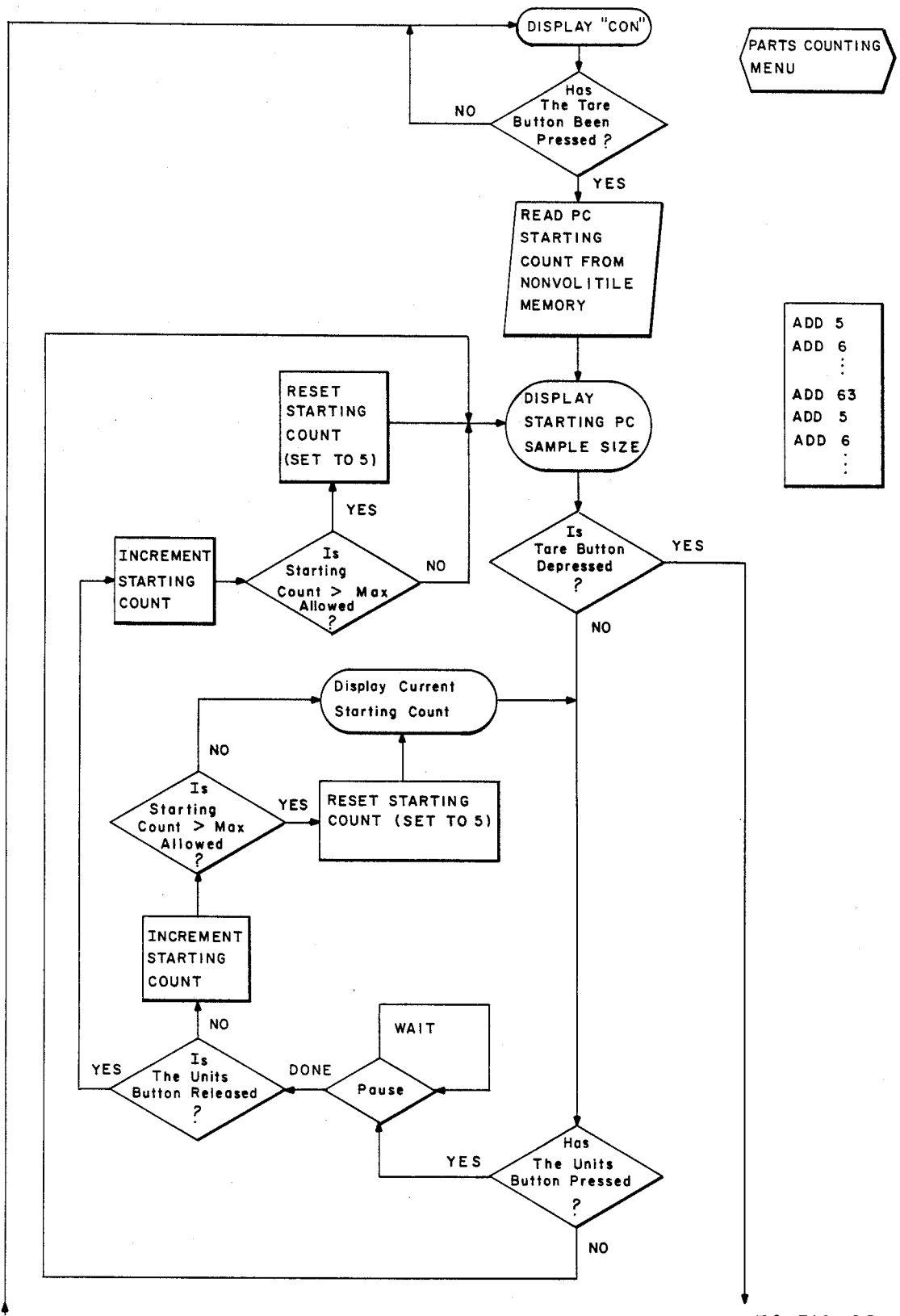
Figure 8B:
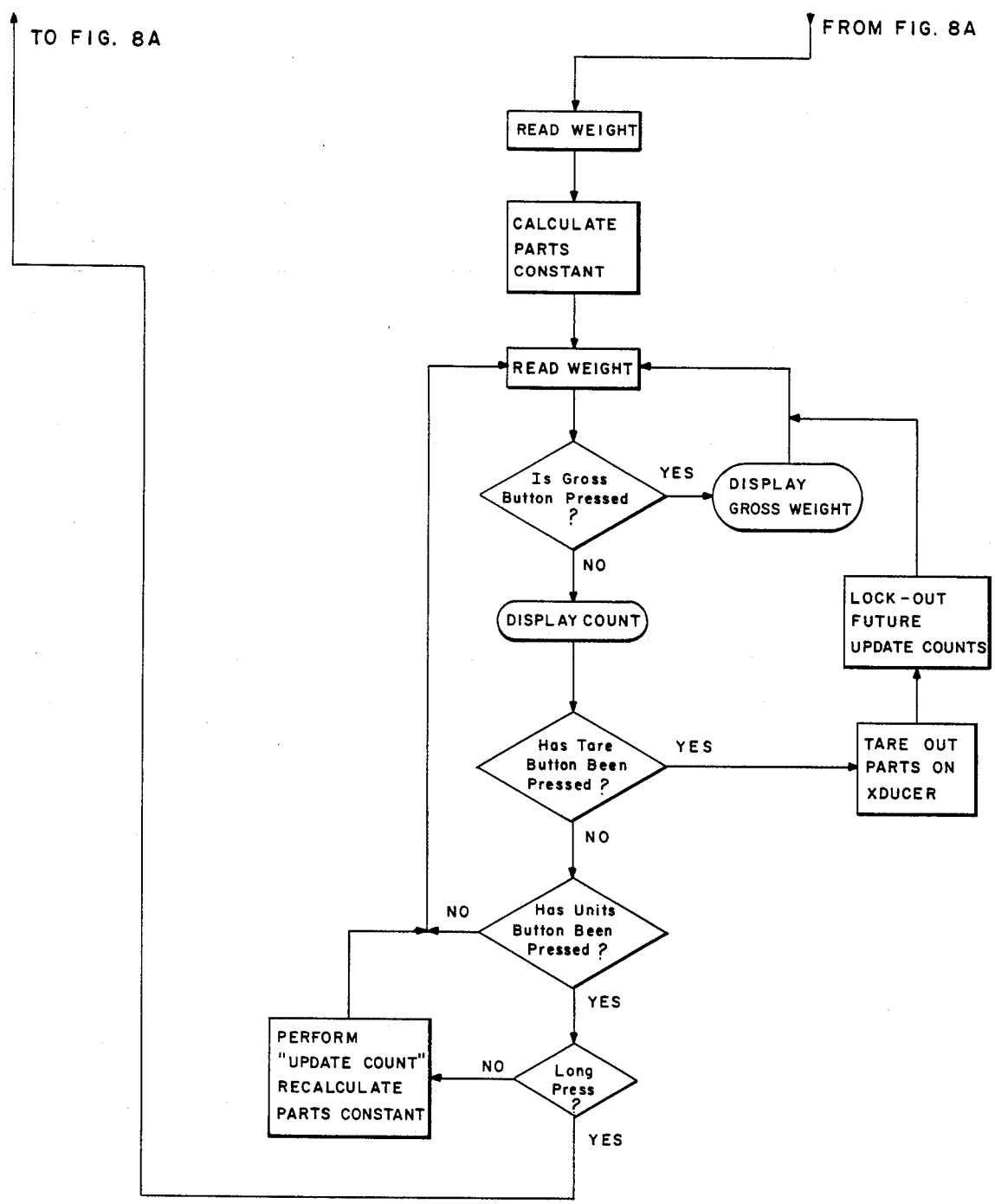

The microprocessor then determines whether the balance is operating in the weighing or counting mode. If the UNITS button 13 has been repeatedly depressed until "CON" has been displayed, the microprocessor determines that the balance is operating in the counting mode. Otherwise, the microprocessor determines that the balance is operating in the weighing mode. If the balance is operating in the weighing mode, the weigh cycle or routine of FIG. 7 is performed. When operating in the counting mode, the parts counting cycle or routine of FIGS. 8A and 8B is performed. The data produced by the weigh cycle or parts counting cycle is then checked for stability and an indication of stability displayed. If consecutive data differ by less than a predetermined amount, stability has been achieved. The data is converted from binary to BCD and then to the seven-segment display data. The balance address is also added to the BCD data and converted to ASCII data.

The seven segment data is then displayed and the ASCII data stored for later transmission. The microprocessor then determines if RS-232 input data is available from a remote computer and if so, processes RS-232 input commands. After processing RS-232 input commands or if no RS-232 input data was available, RS-232 output data is processed in response to autoprint dip switch 46, PRINT button 12, or RS-232 input commands. The program then returns to check front panel switch activity.

FIG. 7 shows the weigh cycle or routine stored in EPROM 34. Upon entering the weigh cycle from the main program in the operate mode, the conversion factor for converting the adjusted data to the displayed units is retrieved from microprocessor internal ROM (read only memory). The adjusted data, which has been stored in a temporary register is multiplied by the conversion factor and the resulting value loaded into the temporary register. The contents of the temporary register are then multiplied by the divisions and the resulting value loaded into the temporary register. If the TARE button has been depressed and a TARE function is pending, the contents of the temporary register are loaded into the TARE register. Thereafter, or if no TARE function was pending, the contents of the TARE register are subtracted from the contents of the temporary register and the resulting value loaded into the temporary register. If this value is over-range, that is, not within the range of the balance, an error message is displayed. If this value is not over-range, the weigh cycle returns to the main program of FIGS. 6A and 6B.

FIGS. 8A and 8B are a flow chart of a routine stored in EPROM 34 which provides a Parts Counting Menu which permits the user to select a number, for example from 5 to 63, of sample parts to be used as a constant in the determination of the average piece weight. After calculating the average piece weight, hereinafter referred to as "parts constant", the user may place an unknown quantity of parts on the weighing platform and the scale will display the total count.

The Parts Counting Menu is accessed by repeatedly depressing the UNIT button until "CON" is displayed. The user then places an empty parts container on the platform and presses the TARE button to TARE out the empty parts container weight and read the parts counting starting count of 5 from nonvolatile memory. The starting sample size is displayed as "Add 5" to inform the user that 5 parts must be placed in the parts container on the weighing platform to calculate the parts constant. If the displayed starting sample size is the desired one, the TARE button is depressed. If the TARE button has not been depressed, a determination is made as to whether the UNITS button has been depressed. If the UNITS button has been depressed, after a predetermined time period it is determined whether the UNITS button has been released. If the UNITS button has been released, the starting count is incremented by 1 and checked to see if it is greater than the maximum allowed starting count of 63. If the starting count is not greater than the maximum allowed, it is displayed. If the starting count is greater than the maximum allowed, it is reset to 5 and displayed. During display count and display gross weight steps, the parts counting cycle returns to the main program loop as shown in FIGS. 6A and 6B to perform the actual display. If the UNITS button has not been released, the starting count is incremented, reset to 5 if greater than 63, and displayed. If the UNITS button remains depressed, the starting count will again be incremented. By continuing to depress the UNITS button, a user can rapidly cycle through the available starting counts.

After the desired starting count has been displayed and the TARE button depressed, the weight of the parts on the platform is read. During read weight steps, the parts counting cycle or menu returns to the main program loop, as shown in FIGS. 6A and 6B, to obtain weight data. The parts constant is calculated by dividing the weight of the parts by the starting count. The weight of the parts on the platform is then read again and the state of the GROSS button is checked. If the GROSS button has been pressed, the gross weight on the platform is displayed and the routine returns to read the weight on the platform. Otherwise, the count or number of parts on the platform is calculated and displayed. During display count and display gross weight steps, the parts counting cycle returns to the main program loop as shown in FIGS. 6A and 6B to perform the actual display. If the TARE button is then depressed, the weight of the parts on the weighing platform or transducer is TARED out and future update counts for the purpose of calculating the parts count are locked out. If the TARE button has not been pressed, a determination of whether the UNITS has been pressed is made. A long press of the UNITS button returns the program to the display "CON" step. A short or momentary press of the UNITS button performs an update count and recalculates the parts constant. This permits the user to improve parts counting accuracy by increasing the number of parts in the sample prior to momentarily depressing the UNITS button. The recalculated parts constant will now be based on the total number of parts on the platform rather than the original sample.

Figure 9A:
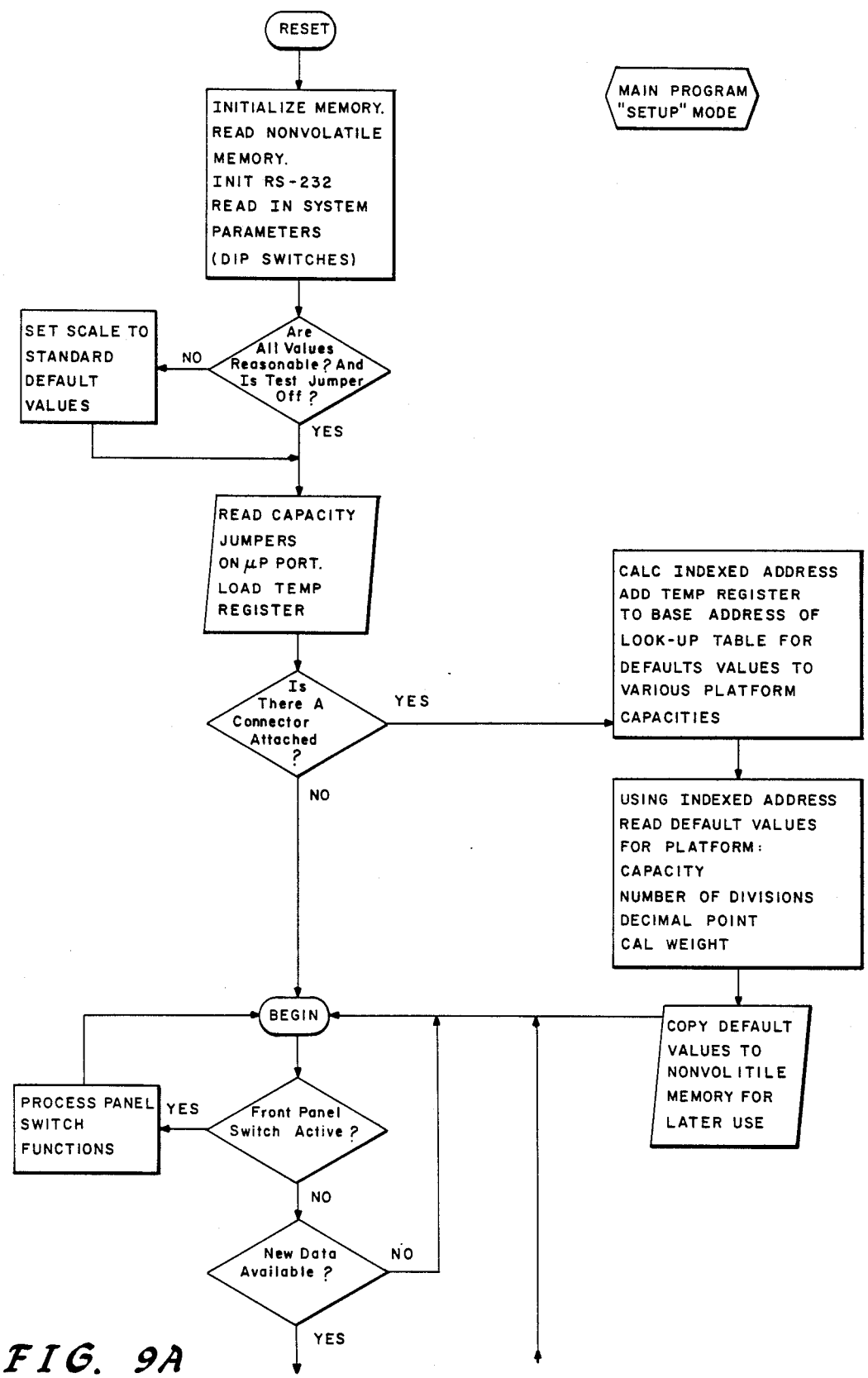
Figure 9B:
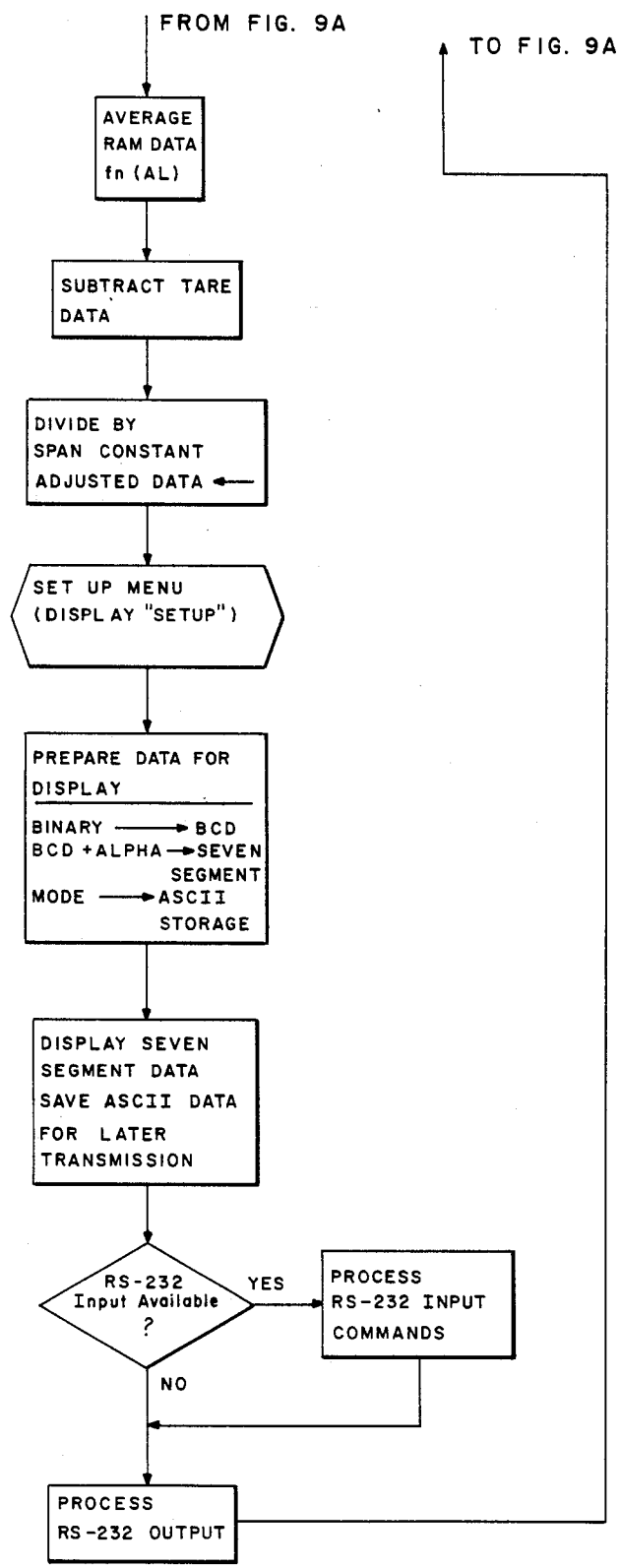

FIGS. 9A and 9B illustrate the main program stored in EPROM 34 to be executed by the microprocessor when the balance is in the setup mode. This program is accessed when calibrate-enable switch 41 is closed and a "0" is therefore present on address line 44. When the balance is turned on, the microprocessor internal memory is initialized, values stored in nonvolatile memory 45 are read, the RS-232 interface is initialized, and system parameters are read from dip switches 46, 47, and 48.

The microprocessor then determines whether the values read from nonvolatile memory 45 are reasonable and whether a test jumper is off. The test jumper can be connected to a test input port of the microprocessor by a service technician to automatically set the scale to standard default values to perform diagnostic testing of the balance. The balance is also set to standard default values if the values read from nonvolatile memory 45 are unreasonable.

The configuration of capacity jumpers A and B then can be read and a value indicating the platform capacity stored. If no connector is attached, front panel switch activity is checked. If a connector is attached, the default values for capacity, number of divisions, decimal point location, and calibration weight of the identified platform are read from an indexed address and stored in nonvolatile memory 45. Front panel switch activity is then checked.

If a front panel switch is active, its function is processed and the front panel switches checked again for activity. If no front panel switch is active, a check is made for new data. If no new data is available, the front panel switches are then checked for activity. If new data is available, an average raw data value is calculated as a function of the averaging level read from nonvolatile memory 45. The tare data is then subtracted and the resulting value divided by the span constant read from nonvolatile memory 45 to arrive at an adjusted data value.

Figure 10:
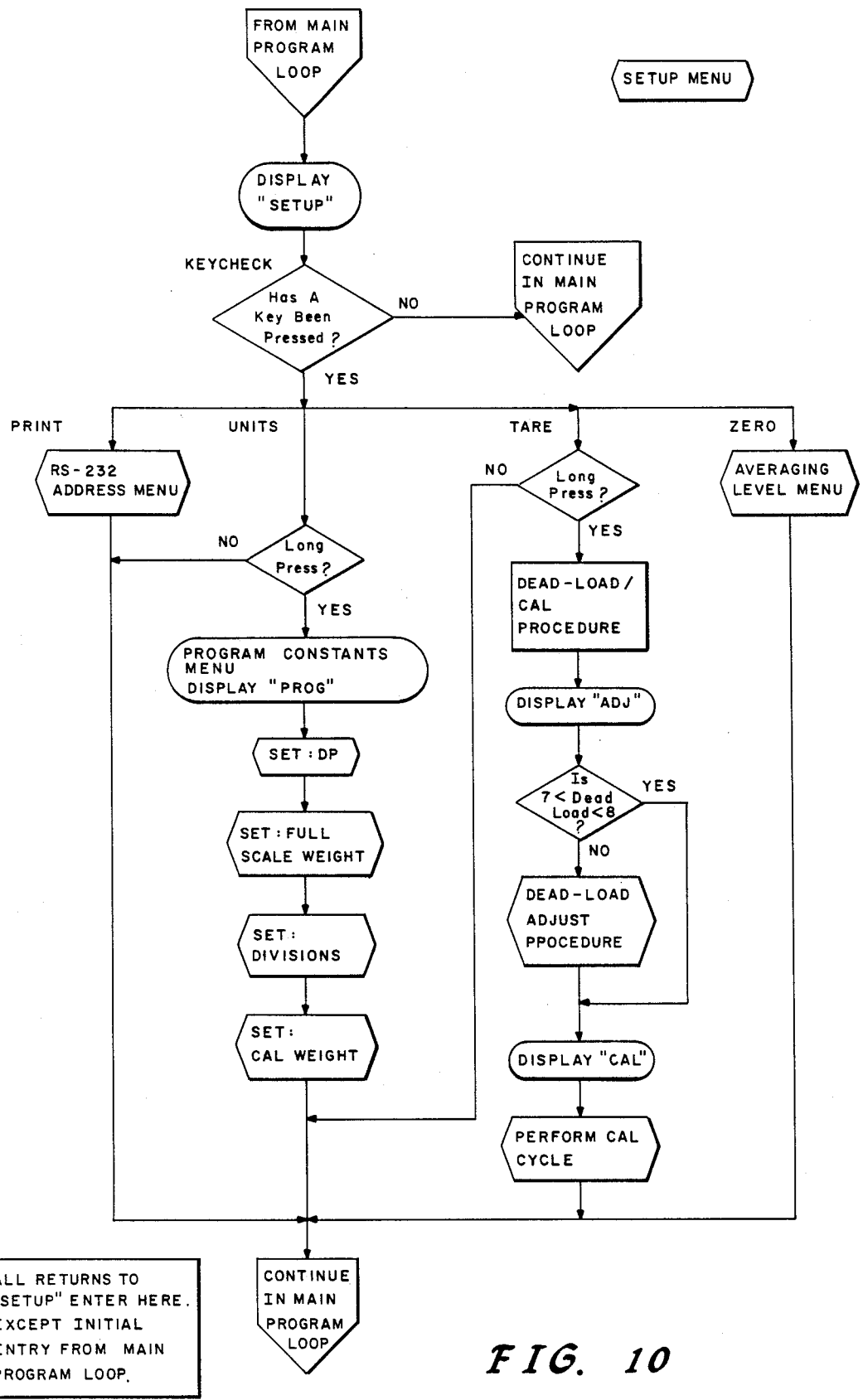

The microprocessor then executes the Setup Menu of FIG. 10. Upon returning to main program, the weight data is prepared for display. The data is converted from binary to BCD and then to seven-segment data. The balance address is also added to the BCD data and converted to ASCII data. The seven-segment data is displayed and the ASCII data stored for later transmission. If RS-232 input data is available, RS-232 input commands are processed. Thereafter, or if no RS-232 input data was available, RS-232 output data is processed. The program then returns to check front panel switch activity.

FIG. 10 illustrates a program stored in EPROM 34 which provides a setup menu enabling the user to set the address, program constants, and averaging level of the balance and to perform the dead-load adjust and calibration procedures using only the PRINT, UNITS, TARE, and ZERO buttons. After entering the Setup Menu, "SETUP" is displayed and a key check is performed to determine if a user desires to alter the setup values. By pressing the PRINT key until "Adr" is displayed, a user can access the Address Menu of FIG. 11 and change the balance address. By pressing the UNITS key for a period of time greater than a predetermined time period, the Program Constants Menu is accessed. This permits a user to set the position of the decimal point (FIG. 12), the full scale weight (FIG. 13), the number of divisions (FIG. 14), and the calibration weight (FIG. 15). Pressing the TARE key longer than a predetermined time accesses a dead-load adjust and a calibration procedure and causes the display to read "Adj". Subsequently, the dead-load is displayed as a percentage of the dynamic range of the A/D converter. The displayed dead-load is checked by the user to see if it is between 7 and 8 percent of the dynamic range of the A/D converter. If the dead-load does not fall within this range, the dead-load adjust procedure should be performed.

In the dead-load adjust procedure, the user adjusts variable resistor 31 until the displayed output of the strain gauge transducer is between 7 and 8. The range of 7 to 8 percent is chosen as it is sufficiently above zero to permit accurate measurement of very light weight but not so high as to unduly limit the range of weights the balance is capable of handling. The balance thus provides an accurate indication of proper dead-load adjustment.

A span verification procedure may also be performed at this time by placing a weight equal to the full scale or capacity of the platform on the platform. The full scale weight is displayed as a percentage of the dynamic range of the A/D converter. A value is desired which would maximize the available span of the A/D converter. If the displayed value is not in the upper range of the span of the A/D converter, for example, in the upper 20%-60% of that range, the gain of programmable amplifier 32 can be adjusted by means of switches 40 until a suitable percentage is displayed. The span verification procedure permits weighing platforms having load cells or transducers of unknown sensitivity to be used and still utilize the greatest possible span of the A/D converter.

After checking dead-load and performing the dead-load adjust procedure if needed, the calibration cycle (FIG. 17) is performed to calibrate the balance.

Pressing the ZERO key until "A.L." is displayed accesses the averaging level menu (FIG. 16) to permit user selection of any one of several averaging levels.

Figure 11:
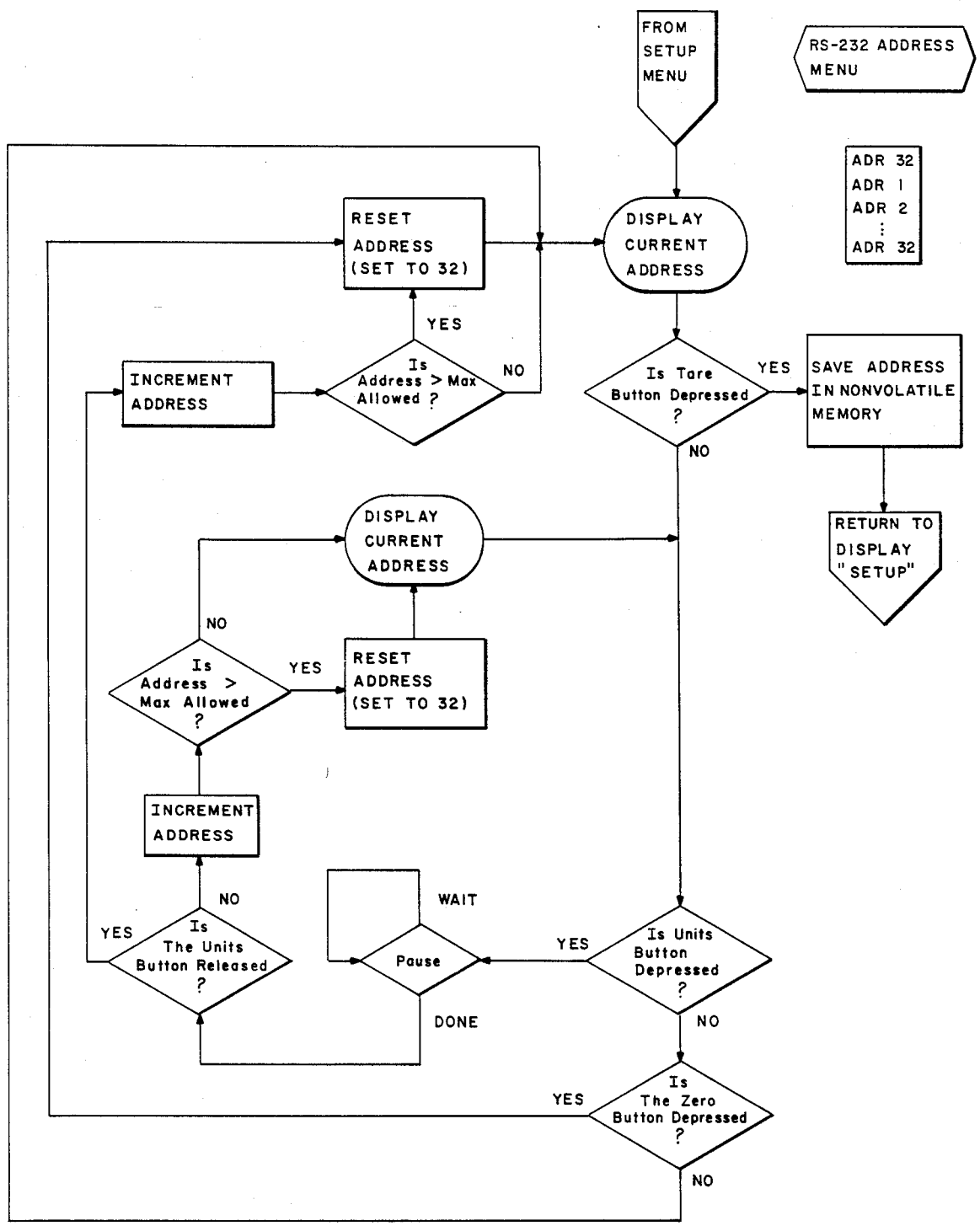

FIG. 11 shows the RS-232 Address Menu stored in EPROM 34 which permits the user to assign an address, for example from 0 to 32, to the electronic balance. In balances in which the address is set to a value from 0 to 31, the address is temporarily displayed upon powering up the balance and subsequently accompanies any data sent via RS-232 interface connection 20 to a remote computer. The address 32 defeats this feature. When an address of 32 has been selected, it will not be displayed upon powering up the balance and will not be transmitted with data sent to a remote computer. In a system in which a plurality of electronic balances are connected to the same computer, the address identifies the electronic balance which transmitted data.

Upon accessing the Address Menu, the address currently stored in nonvolatile memory is displayed. If the displayed address is the desired one, the TARE button is depressed, the displayed address is stored in nonvolatile memory, and the program returns to the main program. If the TARE button has not been depressed, a determination of whether the UNITS button has been depressed is made. If the UNITS button has been depressed, after a predetermined time interval, it is determined whether the UNITS button has been released. If the UNITS button has been released, the address is incremented by one and checked to see if it is greater than the maximum allowed address, which in this case is 32. If the address is not greater than the maximum, it is displayed. If the address is greater than the maximum allowed, it is reset to 0, and 0 is displayed. If the UNITS button has not been released, the address is incremented, reset to 0 if greater than the maximum, and displayed. If the UNITS button remains depressed, the address will again be incremented. Thus, a user can rapidly cycle through available addresses by continuing to depress the UNITS button. Pressing the ZERO button after determining the UNITS button is not depressed resets the address to 32.

Figure 12:
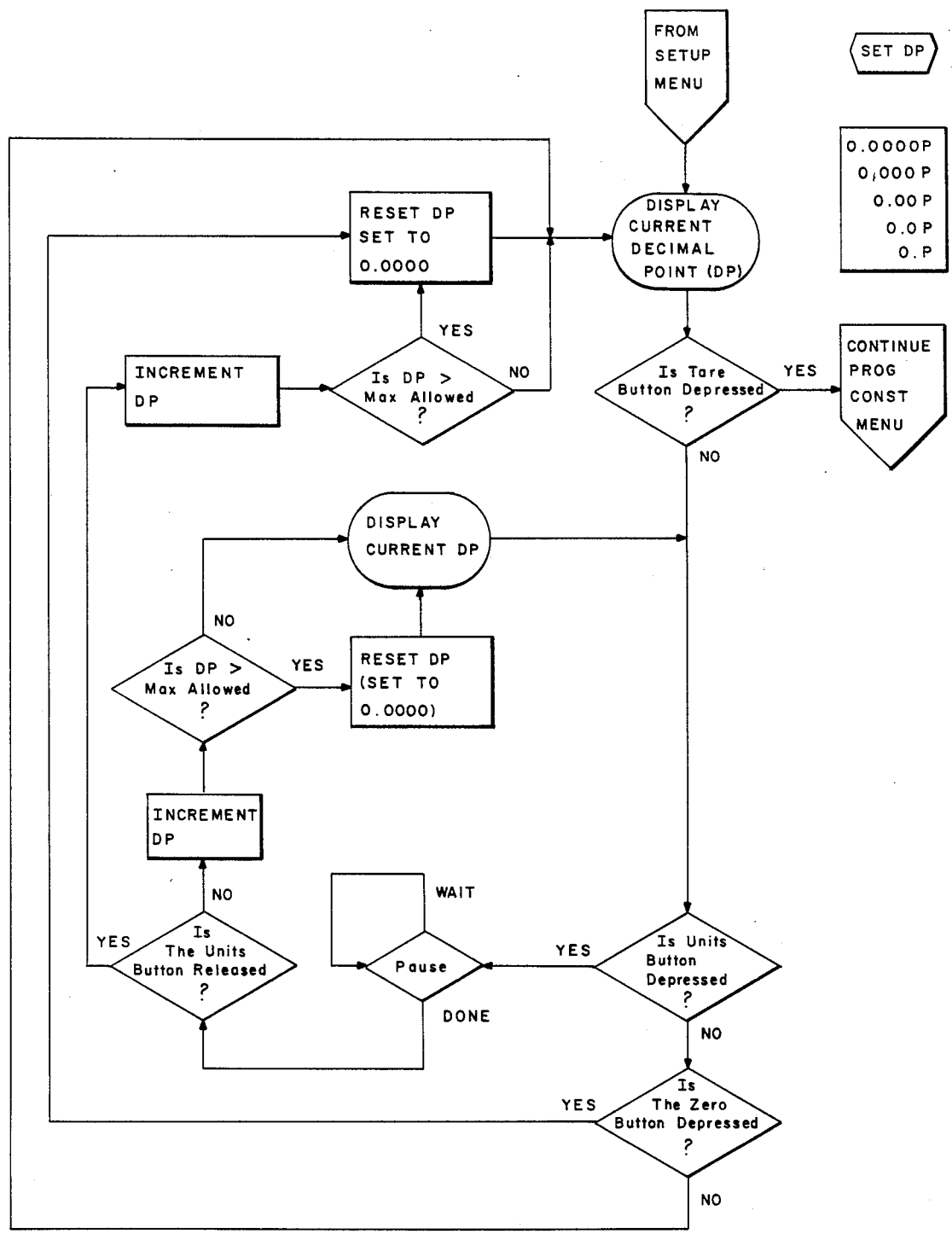

FIG. 12 is a flow chart of a routine stored in EPROM 34 which provides a Set Decimal Points Menu which allows the user to select the location of the decimal point in the display. The decimal point can be located in a predetermined place on the display. When the Set Decimal Points Menu is accessed by the microprocessor, the current position of the decimal point is displayed. If the displayed location is the desired one, the user depresses the TARE button to return to the next operation in the program constants menu. If the TARE button has not been depressed, a determination of whether the UNITS button has been depressed is made. If the UNITS button has been depressed, after a predetermined time period, it is determined whether the UNITS button has been released.

If the UNITS button has been released, the location of the decimal point is incremented by one (i.e., moved right one place) and checked to see if it is greater than the maximum allowed location (i.e., "0".). If the location is not greater than the maximum, it is then displayed. If the location of the decimal point is greater than the maximum allowed, it is reset to 0.0000 and displayed.

If the UNITS button has not been released, the decimal point location is incremented, reset to 0.0000 if greater than the maximum, and displayed. If the UNITS button remains depressed, the location will again be incremented. By continuing to depress the UNITS button, a user can rapidly cycle through available decimal point locations. Pressing the ZERO button after determining that the UNITS button has not been depressed resets the location to 0.0000. The TARE button is pressed to return to the program constants menu.

Figure 13:
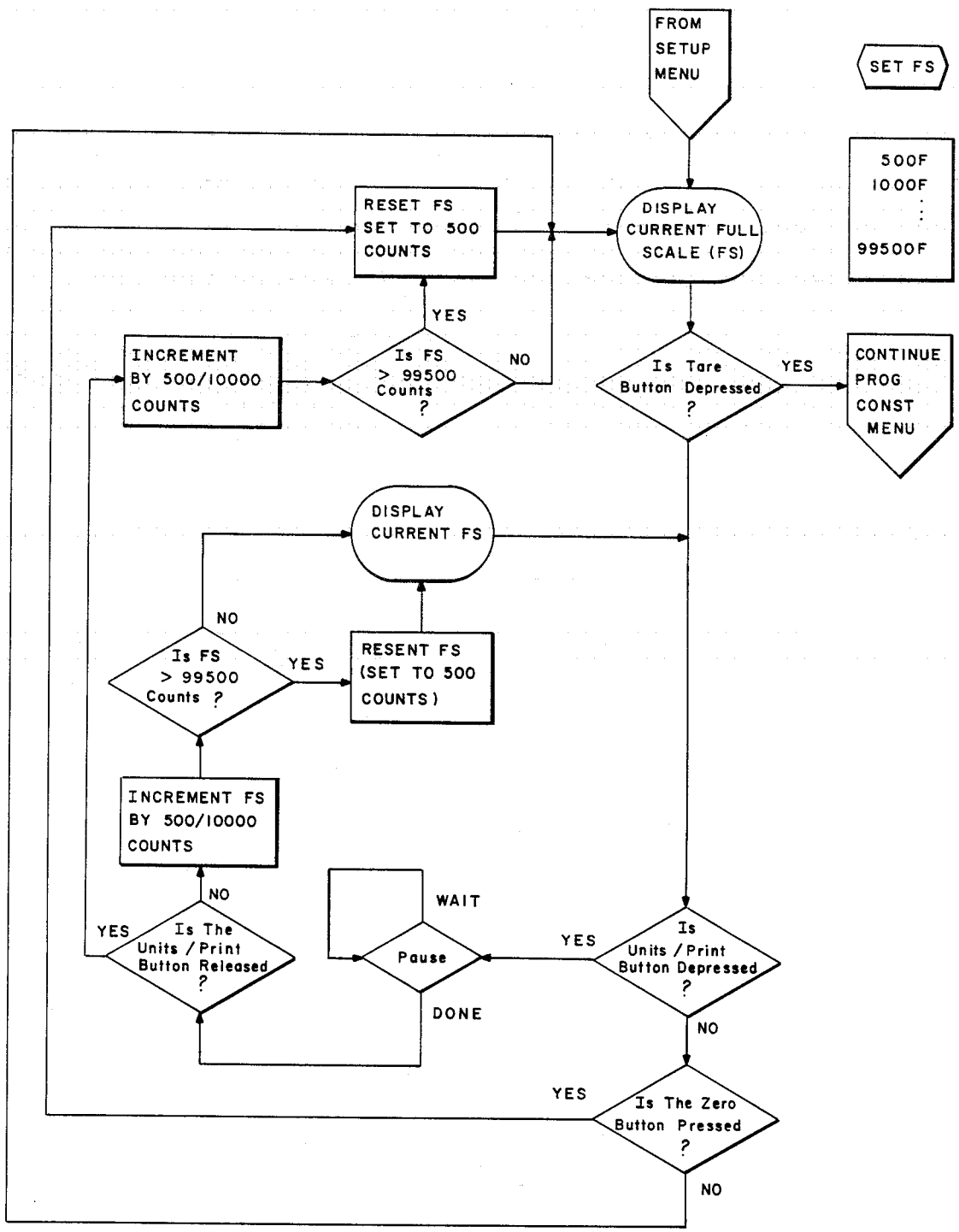

FIG. 13 is a flow chart illustrating a routine stored in EPROM 34 which provides a Set Full Scale Menu which permits the user to set the full scale range of the scale, for example, from 500 to 99,500 display counts. When the Set Full Scale Menu is accessed, the current full scale value is displayed. If the displayed full scale value is the desired one, the user depresses the TARE button and the program then returns to the next operation in the program constants menu. If the TARE button has not been depressed, a determination of whether the UNITS button or the PRINT button has been depressed is made. If the UNITS button has been depressed, after a predetermined time period, it is determined whether the UNITS button has been released. If the UNITS button has been released, the full scale range value is increased by 500 counts and checked to see if it is greater than the maximum full scale range value of 99,500 counts. If the full scale range is not greater than 99,500 counts, it is then displayed. If the full scale range is greater than the maximum it is reset to 500 and displayed. If the UNITS button has not been released, the full scale range is incremented by 500 counts, or reset to 500 if greater than the maximum, and then displayed. If the UNITS button remains depressed, the full scale range will again be incremented. By continuing to depress the UNITS button, a user can rapidly cycle through available full scale ranges in increments of 500 counts.

As shown in FIG. 13, operation of the PRINT button in the same manner as the UNITS button increments the full scale range values in increments of 10,000 counts. Pressing the ZERO button after determining that neither the UNITS button or PRINT button has been depressed resets the full scale range to 500 counts. The TARE button is pressed to return to the program constants menu.

Figure 14:
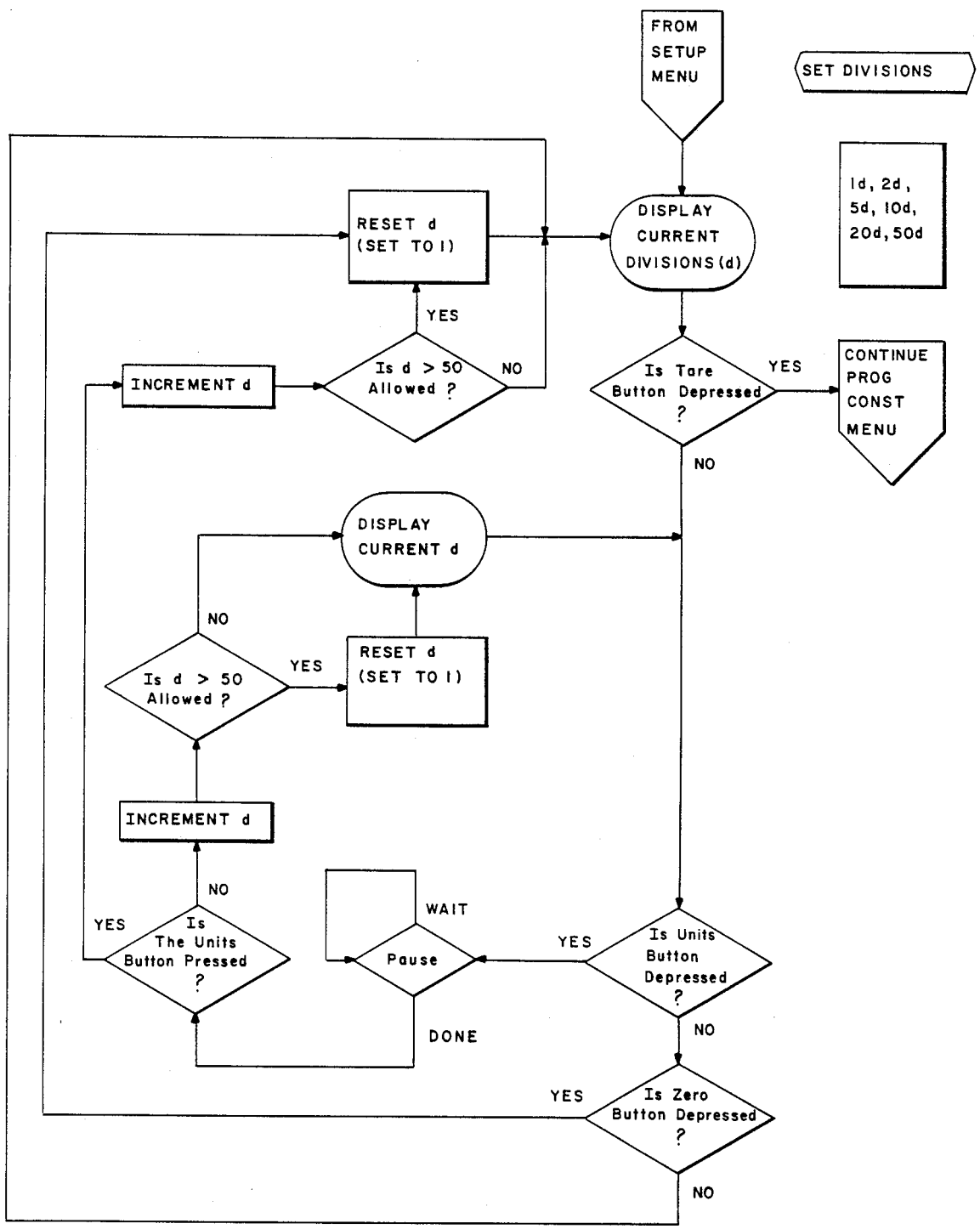
Figure 15:
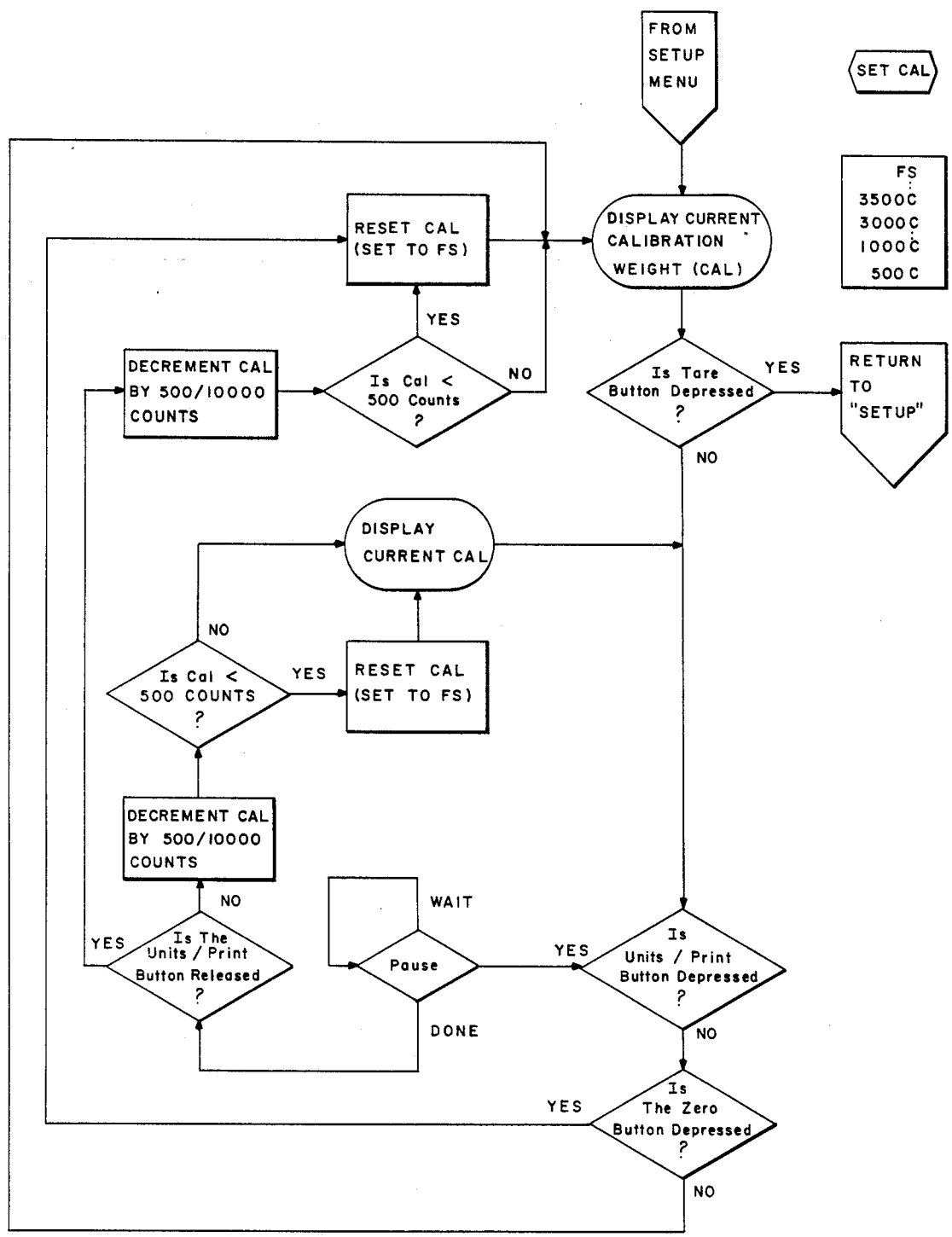

FIG. 14 is a flow chart illustrating a routine stored in EPROM 34 providing a Set Division Menu which permits the user to select a predetermined division size, for example, either 1, 2, 5, 10, 20, or 50. The display is digital and therefore changes in discrete increments. A division is the smallest increment by which the display changes. The user selects a division in order to maintain an appropriate display resolution. For instance, if the scale resolution is to be 1 part in 500 and the full scale range is 1000 counts, then the division setting is 2.

When the microprocessor accesses the Set Divisions Menu, the current division setting is displayed. If the displayed division setting is the desired one, the user presses the TARE button to return the microprocessor to the next operation step in the program constants menu. If the TARE button has not been depressed, a determination of whether the UNITS button has been depressed is made. If the UNITS button has been depressed, after a predetermined time period it is determined whether the UNITS button has been released. If the UNITS button has been released, the division setting is incremented and checked to see if it is greater than the maximum division setting of 50 divisions. If the division setting is not greater than 50, it is then displayed. If the division setting is greater than the maximum, it is reset to 1 and displayed. If the UNITS button has not been released the division setting is incremented, reset to 1 if greater than the maximum, and displayed. If the UNITS button remains depressed, the division setting will again be incremented. By continuing to depress the UNITS button a user can rapidly cycle through the available division settings. Pressing the ZERO button after determining that the UNITS button has not been depressed resets the division setting to 1. The TARE button is pressed to return to the program constants menu.

FIG. 15 is a flow chart of a routine stored in EPROM 34 which provides a Set Calibration Weight Menu which permits a user to select a calibration weight from full scale down to 500 counts in increments of 500 or 10,000 counts. A known calibration weight is placed on the weighing platform to calibrate the scale prior to weighing objects whose weight is not known.

Upon entering the Set Calibration Weight Menu, the current calibration weight is displayed. If the displayed calibration weight is the desired one, the user presses the TARE button to continue in the main program and return to the display "SETUP" step in the SETUP menu. If the TARE button has not been depressed, a determination of whether the UNITS button or PRINT button has been depressed is made. If the UNITS button has been depressed, after a predetermined time period it is determined whether the UNITS button has been released. If the UNITS button has been released, the calibration weight is decremented by 500 and checked to see if it is less than 500 counts. If the calibration weight is not less than 500 counts, it is then displayed. If the calibration weight is less than 500 counts, it is reset to the full scale count and displayed. If the UNITS button has not been released, the calibration weight is decremented by 500 counts, reset to full scale count if less than 500, and displayed. If the UNITS button remains depressed, the calibration weight will again be decremented by 500 counts. By continuing to depress the UNITS key, a user can rapidly cycle through the available calibration weights in increments of 500. Operation of the PRINT button decrements in steps of 10,000 counts. Pressing the ZERO button after determining that neither the UNITS button nor the PRINT button has been depressed resets the calibration weight to the full scale count. The TARE button is pressed to continue in the main program and return to the display "SETUP" step in the SETUP menu.

Figure 16:
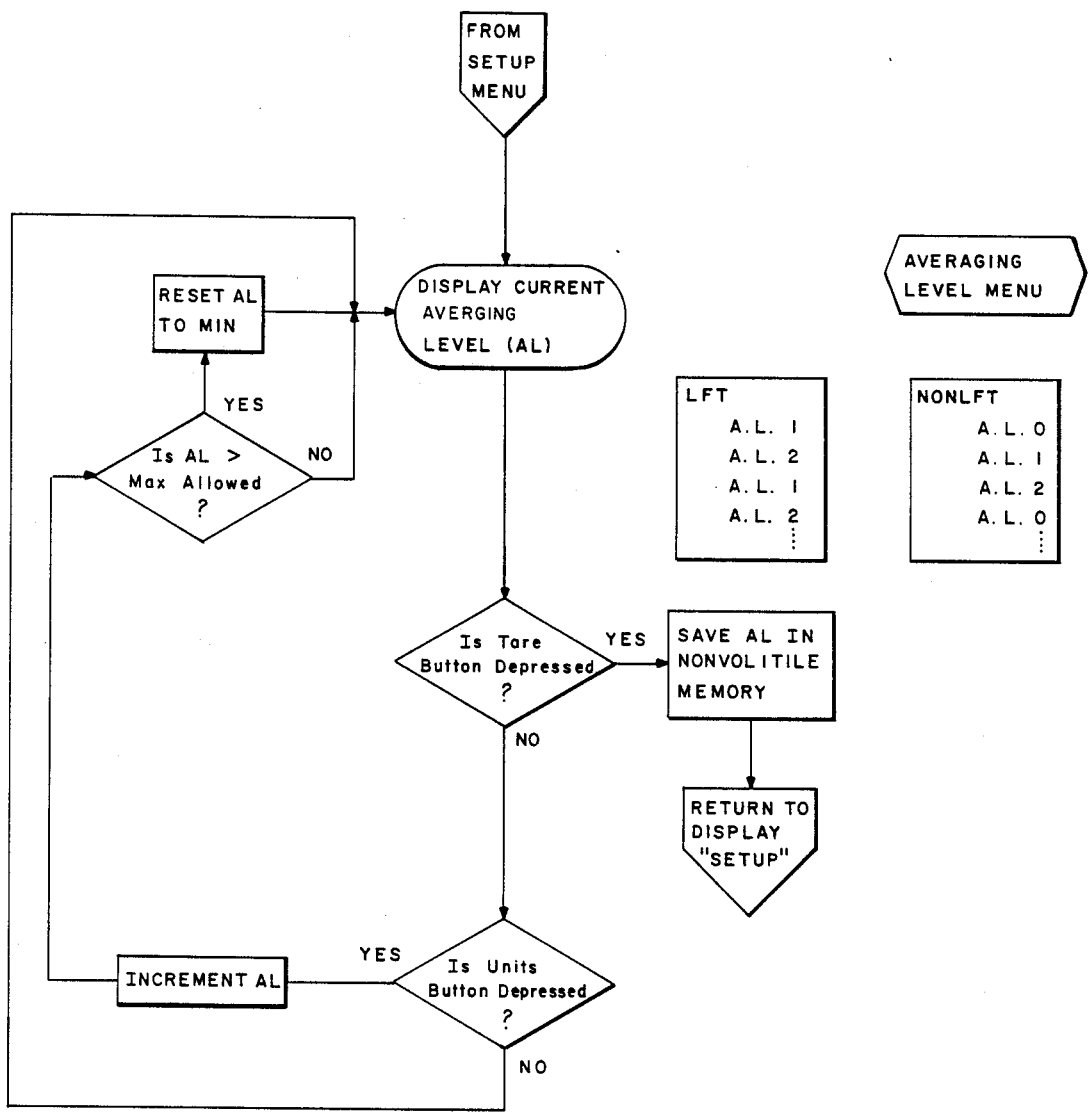

FIG. 16 is a flow chart of a routine stored in EPROM 34 which provides a Set Averaging Level Menu which permits the user to select an averaging level. If the balance is used in Legal For Trade (LFT) applications, the user can select between averaging levels 1 and 2. In non-Legal For Trade (NonLFT) applications, the user can select averaging levels 0, 1, or 2. The averaging level is indicative of the length of time the output of the A/D converter is sampled in determining an average output with level 2 being the longest sampling time. A larger sampling time will produce more accurate data when the scale is used in an environment having excessive levels of vibration or air current.

Upon accessing the Set Averaging Level Menu, the current averaging level is displayed. If the displayed averaging level is the desired one, the TARE button is depressed to store the displayed averaging level in nonvolatile memory and continue in the main program to return to the display "SETUP" step in the SETUP menu. If the TARE button has not been depressed, a determination is made as to whether the UNITS button has been depressed. If the UNITS button has been depressed the averaging level is incremented and checked to see if it is greater than the maximum averaging level allowed of 2. If the averaging level is not greater than the maximum level allowed, it is then displayed. If the averaging level is greater than the maximum, it is reset to the minimum level (1 for LFT, 0 for NonLFT) and the minimum level is displayed. The TARE button is pressed to continue in the main program and return to the display "SETUP" step in the SETUP menu.

Figure 17:
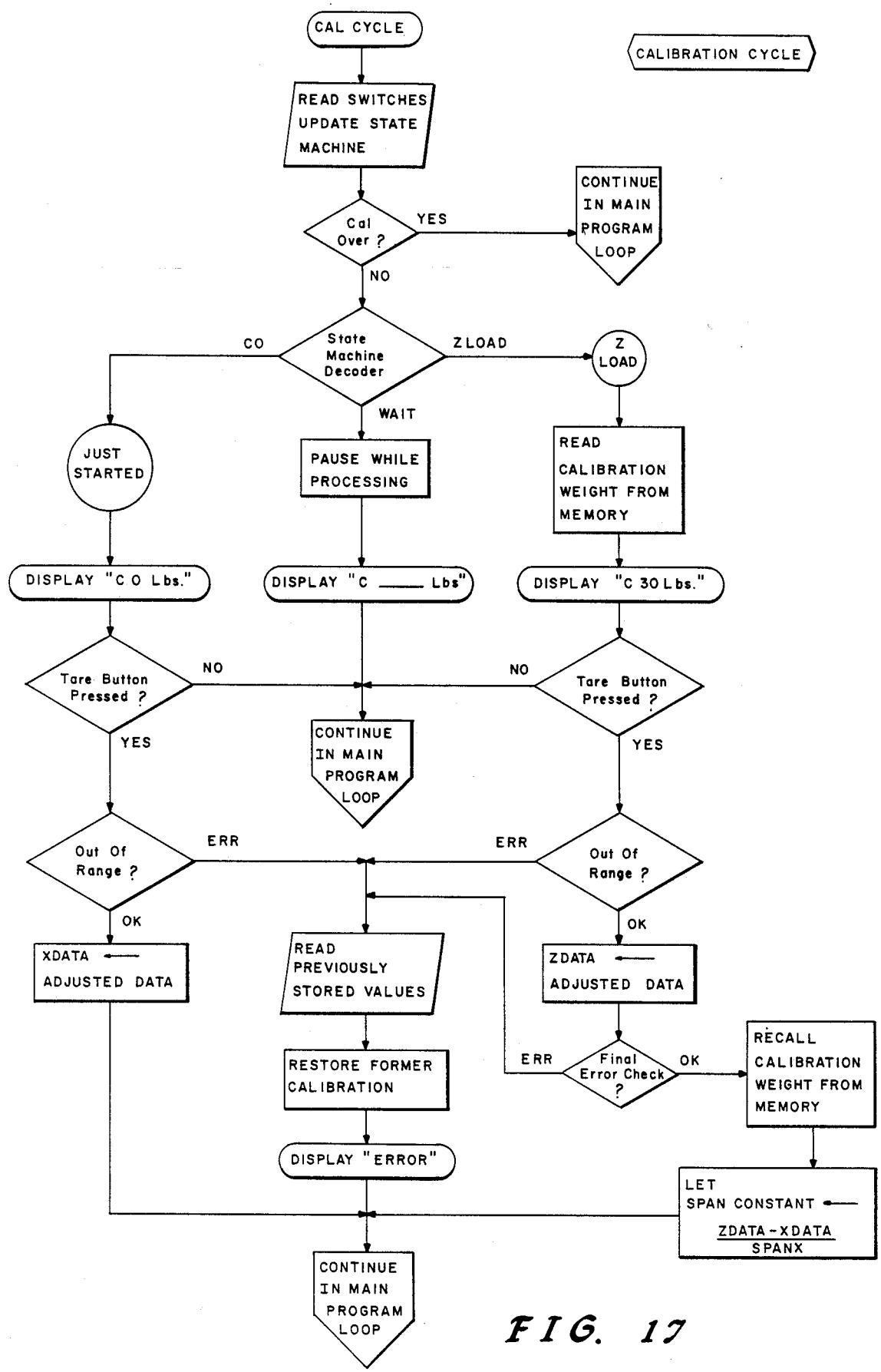

FIG. 17 is a flow chart of a routine stored in EPROM 34 which provides a Calibration Cycle which enables the user to calibrate the scale. Upon entering the Calibration Cycle, the front panel switches are read to update a state machine.

The state machine keeps track of where the microprocessor is in a sequence of events or states. The next state is determined as a function of an input, such as the depression of the TARE button, and the present state. In the Calibration Cycle, the microprocessor operates in the CO state until the TARE button has been pressed. The microprocessor then operates in a WAIT state until processing is complete. The microprocessor then operates in the ZLOD state until the TARE button is again pressed.

After reading the front panel switches to update the state machine, a determination as to whether calibration is over is made. If calibration is over, that is, if "Error" has been displayed or the span constant calculated, the program returns to the main program. Since this is the first entry into the Calibration Cycle, calibration is not over and the state machine decoder is checked to reveal that the microprocessor is in the CO state and calibration has just started. "C Lbs." is then displayed to inform the user that no weight should be placed on the platform. If the TARE button is not then pressed, the program returns to the main program to acquire the most recent weight data and reenters the Calibration Cycle in the CO state. If the TARE button is pressed, it is then determined if the weight data is out of range. If it is out of range, the previously stored calibration values are read to restore former calibration and "Error" is displayed. If the weight data is OK, that is, not out of range, it is loaded into XDATA register and the program returns to the main program and reenters the Calibration Cycle.

Upon reentering the Calibration Cycle after the TARE button has been pressed, the state machine is incremented and the next state entered. If calibration is over, the program returns to the main program. Otherwise, the state machine decoder reveals that the microprocessor is operating in the WAIT state and "C Lbs." is displayed. The program returns to the main program and reenters the Calibration Cycle.

Upon reentering the Calibration Cycle after the TARE button has been pressed and processing is completed, the state machine is incremented and the ZLOD state entered. If calibration is over the program returns to the main program. If calibration is not over, the state machine decoder reveals that the microprocessor is in the ZLOD state. The calibration weight, which in this example is 30 lbs., is read from memory and displayed so that the user may place this weight on the platform. If the TARE button is not pressed, the program returns to the main program and reenters the Calibration Cycle in the ZLOD state. If the TARE button is pressed, the weight data is checked. If it is out of range, previously stored calibration values are read from memory, former calibration restored, and "Error" displayed. If the weight data is OK, it is stored in ZDATA. A final error check is made and if the weight is OK, the calibration weight is recalled from memory and (ZDATA-XDATA)/Span X, where Span X is the scale resolution, a function of full scale and divisions, is calculated to determine the span constant. The program than returns to the main program.

Although the invention has been described with reference to a preferred embodiment, other modifications and variations will be apparent to those skilled in the art without departing from the scope of this invention which is defined in the appended claims.

What is claimed is:

1. An electronic balance, comprising:
   a means for generating data relating to weight, comprising an A/D converter;
   a means for displaying the weight related data as a percentage of the dynamic range of the A/D converter; and
   a means for modifying the weight related data so that the weight related data is within a predetermined portion of the dynamic range of the A/D converter.

2. An electronic balance as in claim 1, wherein:
   the means for generating further comprises a transducer which generates an analog signal which is supplied to the A/D converter; and
   the means for modifying comprises a span adjustment means including a programmable gain amplifier having first and second inputs connected to the transducer and an output connected to the A/D converter, and a dead-load adjustment means including a variable resistor connected to the transducer and one of the inputs of the programmable gain amplifier.

3. A method of operating the electronic balance of claim 2, comprising the steps of:
   generating data relating to dead-load;
   adjusting the variable resistor to bring the dead-load related data to within a first predetermined portion of the dynamic range of the A/D converter;
   generating data relating to full capacity; and
   adjusting the gain of the programmable gain amplifier to bring the full capacity related data to within a second predetermined portion of the dynamic range of the A/D converter.

4. The method of claim 3, wherein:
   the first predetermined portion is within seven and eight percent of the dynamic range of the A/D converter, and
   the second predetermined portion is within forty and eighty percent of the dynamic range of the A/D converter.

* * * * *